No. 793,005. PATENTED JUNE 20, 1905.
B. F. D. MILLER.
STRAINER.
APPLICATION FILED JUNE 28, 1904.

2 SHEETS—SHEET 1.

Witnesses:
W. H. Ourand.
J. W. Hister.

Inventor:
Benjamin F. D. Miller,
By Louis Bagger & Co.
Attorneys.

No. 793,005. PATENTED JUNE 20, 1905.
B. F. D. MILLER.
STRAINER.
APPLICATION FILED JUNE 28, 1904.

2 SHEETS—SHEET 2.

WITNESSES:

INVENTOR:
B. F. D. MILLER
By
Louis Bagger & Co.
Attorneys

No. 793,005. Patented June 20, 1905.

UNITED STATES PATENT OFFICE.

BENJAMIN F. D. MILLER, OF WOOSTER, OHIO, ASSIGNOR TO LEWIS B. LE ROY AND ROBERT C. FLACK, OF WOOSTER, OHIO.

STRAINER.

SPECIFICATION forming part of Letters Patent No. 793,005, dated June 20, 1905.

Application filed June 28, 1904. Serial No. 214,492.

*To all whom it may concern:*

Be it known that I, BENJAMIN F. D. MILLER, a citizen of the United States, residing at Wooster, in the county of Wayne and State of Ohio, have invented new and useful Improvements in Strainers, of which the following is a specification.

My invention relates to improvements in screen or drain attachments applicable particularly to culinary cooking vessels.

Said invention has for its object to provide for the ready screening or draining off of the water in which the edibles or contents have been cooked or boiled after the cooking operation and without experiencing unpleasant or annoying consequences from the escaping steam or vapor arising therefrom.

It is also characterized by simplicity and can therefore be cheaply manufactured and readily or quickly applied for use.

Said invention consists of novel structural features, substantially as hereinafter more fully disclosed by the following specification and particularly pointed out by the claims.

Figure 1:
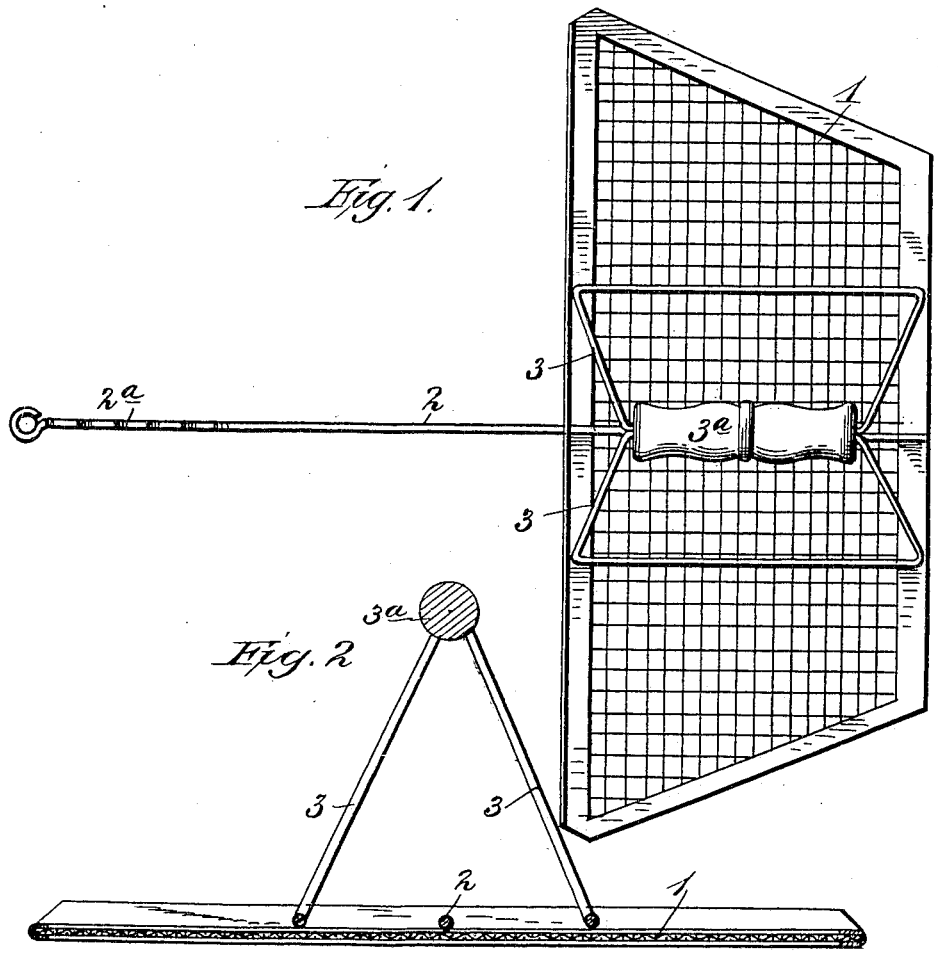
Figure 2:
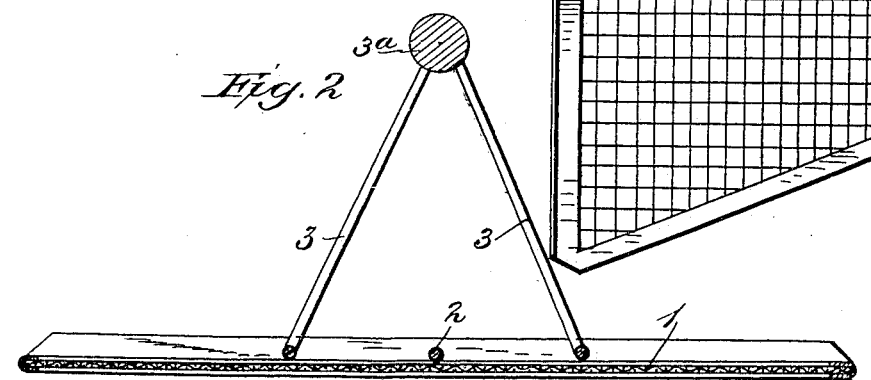
Figure 3:
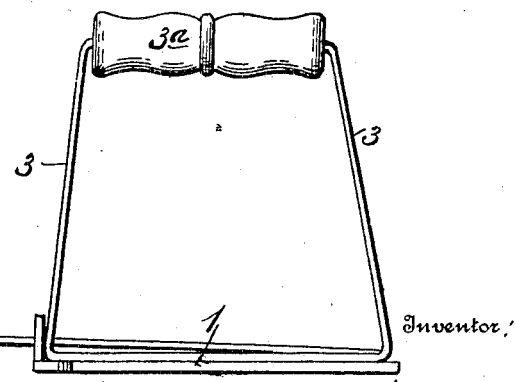
Figure 4:
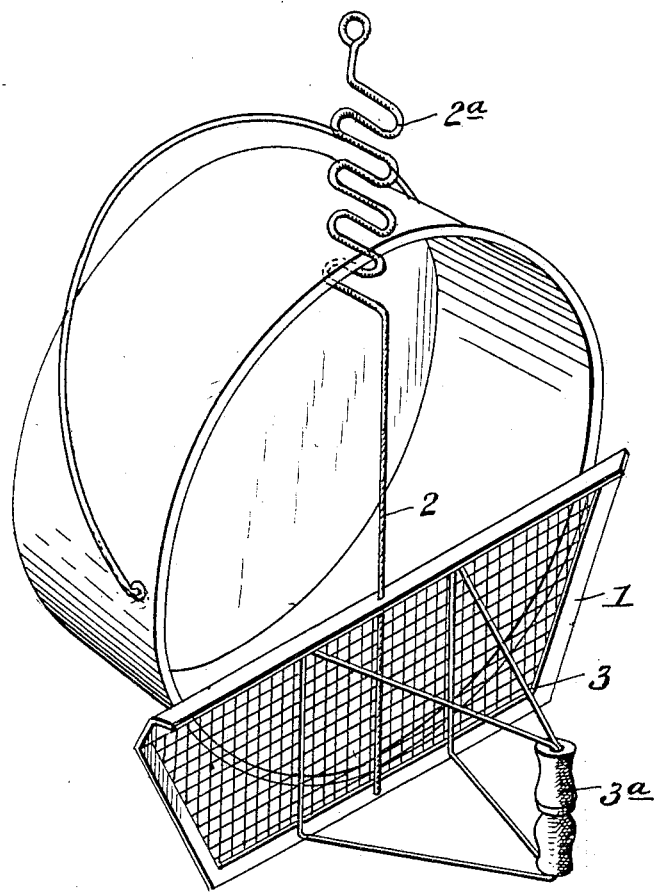

In the accompanying drawings, illustrating the preferred embodiment of my invention, Figure 1 is a plan view thereof. Fig. 2 is a vertical transverse section, and Fig. 3 is an end elevation, of the same. Fig. 4 is a view showing the application of my invention to a cooking utensil.

In the carrying out of my invention I provide a guard 1, which, as shown, is a wire screen, or it may be constructed of a piece of metal finely perforated or rendered foraminous, as will be readily understood. Said guard or screen may be of any suitable outline for the intended purpose and has secured transversely thereto, preferably as shown, a wire rod 2, extending a suitable distance therefrom beyond what may be termed its "rear edge" and having a plurality or number of successive bends or undulations $2^a$, the purpose of which will be apparent presently, the same terminating in a manner adapted to be conveniently grasped by the finger of the user. To said screen or guard is also secured means for readily applying it and holding it when applied, as hereinafter seen, consisting, preferably, of two upright stout wire frames or arms 3, with their lower horizontal portions suitably secured to the rim or margin of said guard or screen and their vertical portions converged and meeting at the upper upturned ends, which are preferably inserted or tucked into the ends of a bored handhold $3^a$.

In using my invention as occasion may require—say, in connection with a culinary cooking utensil or vessel, it being assumed that the contents thereof have been cooked or boiled and the removal thereof is desired—the lid or cover of said vessel is removed, allowing the hot vapors or steam to escape at the outset, and the screen or guard placed upon the vessel across its pouring spout or edge, and the required bend or notch $2^a$ of the member 2 of my device caught upon or engaged with the rear edge of said vessel. The bail or handle of said vessel is grasped with one hand and the other hand applied to the handhold $3^a$ of the handle 3 of said device, and by pulling forward upon said bail and pressing oppositely upon said handhold said vessel will be tilted and the liquid portion of its contents caused to pass out through said screen or guard, while the solid portion of such contents of course will be restrained or prevented from leaving said vessel. This arrangement or device providing for the escape of the hot vapors or steam, as above noted, at the outset, the hands are not required to be placed in such position as to expose the same thereto, as would be the case where the lid or cover of the vessel is temporarily held by the hand partially removed from said vessel, as usually practiced to hold back the solids in the vessel during the draining or removing of the liquid portion of the contents thereof. It is also noted that by providing the rod member with a plurality of successive bends or notches the device is adapted to be applied to cooking vessels of various sizes, as is obvious.

Latitude is allowed herein as to details, as they may be changed as circumstances suggest without departing from the spirit of my invention and said invention yet be protected.

What I claim is

1. A device of the character described, consisting of a screen adapted to rest upon the pouring edge of a cooking utensil and having secured to its upper surface, about midway thereof, means for manipulating the same formed of opposite upstanding converging frames and a handhold having the upper ends of said frames secured to its ends, and an outstanding horizontal rod secured about centrally to said screen and adapted at its opposite end portion to engage the corresponding edge of said utensil.

2. A device of the character described, embracing a screen-guard having a handle member comprising outer end converging frames with a handhold secured to, and uniting the latter at their meeting portions, said guard also having an extended rod member formed with a number of bends to engage the edge of a cooking vessel to which it may be applied.

In testimony whereof I have signed my name to this specification in the presence of two subscribing witnesses.

BENJAMIN F. D. MILLER.

Witnesses:
E. W. NEWKIRK,
W. G. PATTERSON.